United States Patent

Matsuura

[11] 3,921,467
[45] Nov. 25, 1975

[54] DRIVE SYSTEM FOR CYCLE

[76] Inventor: Hideji Matsuura, Suite 505, 17-17 Mita 4-chome, Minato, Tokyo, Japan

[22] Filed: Mar. 11, 1974

[21] Appl. No.: 450,174

[30] Foreign Application Priority Data
June 9, 1973  Japan............................ 48-64939

[52] U.S. Cl. ................ 74/219; 280/261; 280/269; 280/282
[51] Int. Cl.².... F16H 7/00; B62M 1/02; B62K 1/00
[58] Field of Search ....... 74/219; 280/261, 269, 282

[56] References Cited
UNITED STATES PATENTS

| | | | |
|---|---|---|---|
| 3,026,117 | 3/1972 | Clark | 280/261 X |
| 3,329,444 | 7/1967 | Lidov | 280/261 X |
| 3,466,059 | 9/1969 | Kiernan | 280/261 |
| 3,551,003 | 12/1970 | O'Hara | 280/261 |
| 3,820,820 | 6/1974 | Kutz | 280/261 X |

*Primary Examiner*—Leonard H. Gerin
*Attorney, Agent, or Firm*—Armstrong, Nikaido & Wegner

[57] ABSTRACT

A drive train for a cycle is provided wherein the drive train is located in the center of the cycle body along the longitudinal axis thereof. The drive train includes a primary sprocket and final sprocket with a tensioner sprocket therebetween. A secondary sprocket may be included between the primary and final sprocket to alter the gear ratios of the drive train.

3 Claims, 5 Drawing Figures

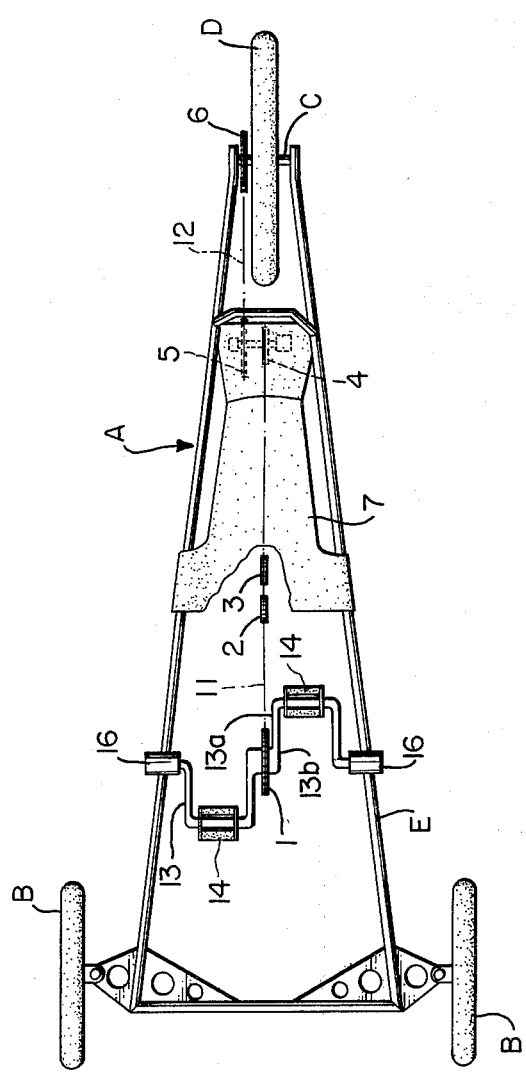
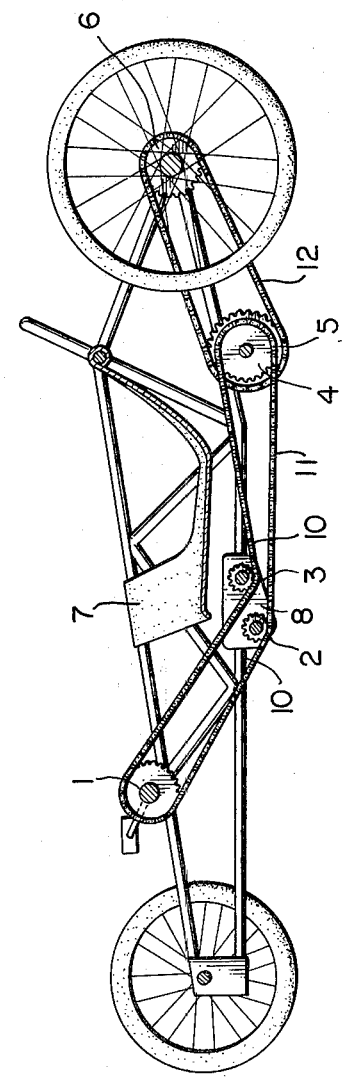

DRIVE SYSTEM FOR CYCLE

BACKGROUND OF THE INVENTION

1. Field of the Invention

The present invention relates to a drive system for a cycle positioned in the center of the cycle in the longitudinal direction of the body of the cycle, and more particularly to a drive system wherein a primary sprocket is provided at the center of a center crank arm of a crank shaft having a pair of right and left pedals, a final sprocket is provided for driving a drive wheel, and a pair of tensioner sprockets are located between the above two sprockets. Chains are engaged on the respective sprockets to directly drive, or a secondary sprocket and a secondary chain are added to indirectly drive as required.

The drive train disclosed herein can be used on a cycle such as that disclosed in my co-pending U.S. application Ser. No. 450,230 filed Mar. 11, 1974, said co-pending application being incorporated herein by reference.

2. Brief Description of the Prior Art

Conventional drive systems includes the side drive type, that is, in which the drive sprocket and chain are provided outside the space frame to drive the rear wheel. The disadvantage with the conventional drive system is the danger of entangling the hands, feet or clothing of the rider or walker when the rider gets on and off or the cycle hits the walker.

Another disadvantage of the conventional drive system is that shafts and other parts are extended outwards in a single direction during running, producing excessive loads on the shafts with respect to flexural rigidity and strength, thus resulting in possible damage. Particularly, an excessive force is always exerted on the space frame, so that the load is poorly distributed, thus sometimes causing an unexpected fall.

Another disadvantage with the conventional drive system is that the appearance is not good since the driving system including the chain and sprocket is located outside the body.

SUMMARY OF THE INVENTION

It is an object of the present invention to provide an improved system for a cycle which overcomes the disadvantages of the prior art. In the present invention, the conventional side drive system is replaced with a drive system in which a pair of tensioner sprockets are arranged between a primary sprocket and a final sprocket. The primary sprocket is fixed at the center of the center crank arm of a crank shaft supported at both ends with bearings on both sides of the body of the cycle and a pair of pedals are mounted on the shaft. The final sprocket is provided for driving at least one rear wheel supported with a bearing on the rear shaft of the body. The cycle is driven through chains engaged on the sprockets. This arrangement insures safety cycling for the rider and walkers, greatly increases durability of the shafts and space frame, and reduces the weight of the cycle. Additionally it is fairly inexpensive, has a lower center of gravity and allows a lower cycle body weight. The lowering of the center of gravity provides high stability of running, and an asthetically beautiful appearance.

DESCRIPTION OF THE DRAWINGS

FIG. 1 is a plan view of the body.

FIG. 2 is a sectional side view of the portion adjacent to the center line of the body in FIG. 1.

DESCRIPTION OF THE PREFERRED EMBODIMENT

Figure 3:
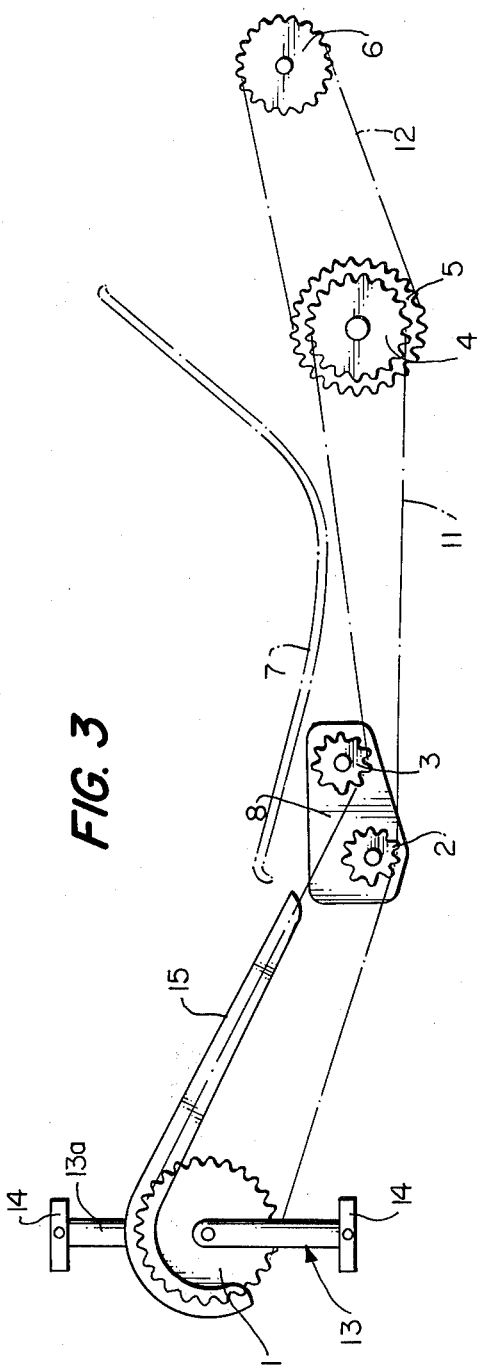
FIG. 3 is a detailed explanatory view of the drive system.

In the figures, A indicates the body of the low center-of-gravity cycle constructed of a pipe frame on which a rider can sit substantially lying on his back. A side member frame is formed almost symmetrically on both sides. The body may be constructed of a panel frame into a single unit. B is a steering wheel fitted on each side of the front of the body A, C is a rear wheel shaft, and D is a drive wheel supported on the rear wheel shaft C by means of a bearing. A drive mechanism for driving the drive wheel D is constructed as described below. A washer plate (not shown) is secured on each front lower member E of the side member frame of the body A by welding or other means. A bearing is fixed on the washer plate by means of screws and nuts through a bearing holder 16. The bearing rotatably supports the respective ends of a crank shaft 13 fitted with a pair of pedals 14. A primary sprocket 1 is securely fixed on a mounting portion 13b provided at the center of a center crank arm 13a of the crank shaft 13. As clearly seen from the schematic illustration of the structure of the drive system shown in FIG. 3, a primary chain 11 driven by the primary sprocket 1 is changed in the direction by a pair to tensioner sprockets 2 and 3 under seat 7, and drives secondary sprockets 4 and 5 fixed and arranged on the same shaft located towards the rear portion of the body. The secondary sprocket 5, in turn, drives a secondary chain 12, which drives a final sprocket 6 for driving the drive wheel D. Depending on position of the rider and arrangement of the tensioner sprockets 2 and 3, the secondary sprockets 4 and 5 and the secondary chain 12 may be ommitted so that a single primary chain 11 may be used to directly drive the final sprocket 6 through the tensioner sprockets 2 and 3. In order to protect the legs and feet of the rider, a chain guard 15 is provided.

Figure 5:
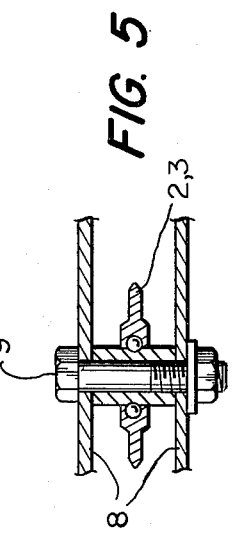
FIG. 5 is a sectional plan view showing the mounting state of the tensioner sprocket.
Figure 4:
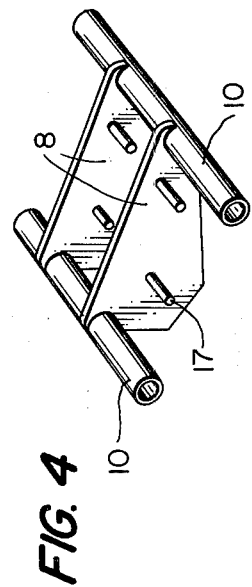
FIG. 4 is an oblique view showing an example of details of the mounting portion of the tensioner sprocket.

FIG. 4 shows an example of detailed structure of the fixing portion for the tensioner sprockets 2 and 3. In the figure, 8 indicates the pair of tensioner sprockets which are secured with welding or otherwise affixed on a pair of cross members 10 which are fixed on the front lower member E of the side member frame of the pipe space frame. As illustrated in FIG. 5, which is the sectional view showing how the tensioner sprockets 2 and 3 are fixed, each tensioner sprocket has an elongated hole so that a mounting screw 9 for fixing the tensioner sprocket can be shifted and fixed for adjusting the tension of the chain.

As clearly seen from the above description of the embodiment, the driving system for cycle according to the present invention has the following constructional features. In the cycle having two front steering wheels and at least one rear drive wheel provided on the body having a side member frame or panel frame the primary sprocket is fixed at the center of the center crank arm of the crank shaft which is rotatably supported at the both ends thereof on both sides of the above body and has the pair of right and left pedals. A pair of tensioner sprockets are arranged between the primary sprocket and the final sprocket for driving the above drive wheel, and the above sprockets are driven through chains. The drive system comprised of the sprockets and chains is located in the center of the body. This arrangement has the advantage that the hands, feet and clothing of the rider and walkers cannot be entangled in the drive mechanism.

Further, an excessive force cannot be exerted on the space frame during running, because the shafts and the related means do not hang outward from the body. This has the advantage that the shafts themselves can be reduced in weight, and large brackets are not required, thus permitting reduction of the manufacturing cost.

Furthermore, since the drive system including the chains and sprockets are not provided outside the body, the appearance of the cycle is excellent.

Furthermore, in the construction of the present invention, the primary sprocket is fixed at the center of the center crank arm, so that it is located at a fixed position between both legs of the rider an all times. This insures that the load of the body is not unbalanced wherever the cycle is turning in any direction, forward, backward, right or left. In addition, the pair of the tensioner sprockets permit the sitting position of the rider to be lower, thereby lowering the center of gravity of the body and increasing the running stability of the cycle. The drive force is transmitted to the rear wheel by bending the combination of the drive chains provided between the both legs of the rider and loosening of the drive chains is prevented thereby preventing the chains from getting out of place.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than the foregoing description, and all changes which come within the meaning and range of equivalency of the claims are therefore intended to be embraced therein.

I claim:

1. In a cycle having a body, pedal means mounted on said body, and at least one rear drive wheel means the improvement comprising a drive means including:
   a. primary sprocket means mounted on said pedal means;
   b. final sprocket means mounted on said rear drive wheel means;
   c. chain means having an upper and lower portion coupling said primary and final sprocket means; and
   d. tensioner sprocket means mounted on said body comprising two adjustable sprocket wheels positioned between said primary and final sprocket means, one of said sprocket wheels engaging said upper portion of said chain means and the other of said sprocket wheels engaging the lower portion of said chain means, wherein said sprocket wheels can be adjusted to adjust the tension of said chain means; and,
   wherein said primary and tensioner sprocket means are positioned along the center line of said body.

2. The cycle of claim 1 further including secondary sprocket means positioned between said primary sprocket means and said final sprocket means wherein said chain means includes two chains, one engaging said primary and secondary sprocket means, and the other engaging the secondary and final sprocket means.

3. The cycle of claim 1 wherein said pedal means includes two pedals and wherein said primary sprocket means is positioned between said two pedals.

* * * * *